UNITED STATES PATENT OFFICE.

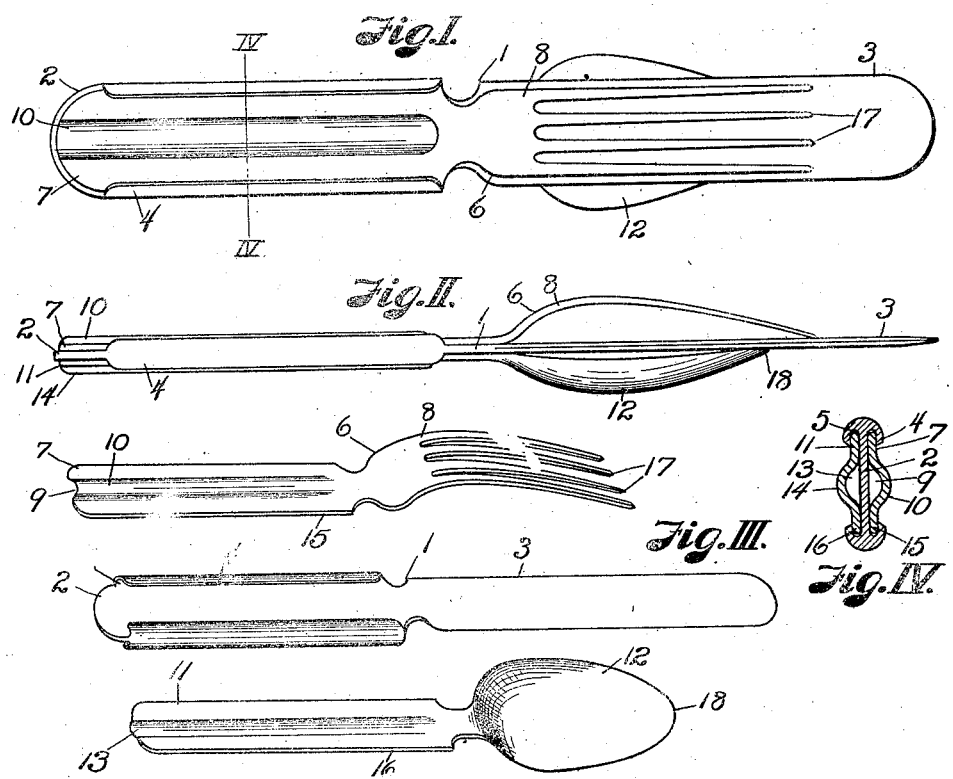

JOEL E. HAWLEY, OF KANSAS CITY, MISSOURI, ASSIGNOR OF ONE-HALF TO HARRY SNYDER, OF KANSAS CITY, MISSOURI.

COMBINATION-TABLEWARE.

1,053,387.  Specification of Letters Patent.  Patented Feb. 18, 1913.

Application filed January 9, 1912. Serial No. 670,153.

*To all whom it may concern:*

Be it known that I, JOEL E. HAWLEY, a citizen of the United States, residing at Kansas City, in the county of Jackson and State of Missouri, have invented certain new and useful Improvements in Combination-Tableware; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in combination table ware and has for its object to provide a device of this class which is simple in construction, easy of assemblage and cheap to manufacture.

Another object is to construct a device, the members of which are readily accessible and sanitary when in assembled relation.

A further object of my invention is to provide a combination device, the members of which are stamped out of sheet metal and assembled to economize material and space, being especially adaptable for outing and army equipment, or in cafeterias, wherein simplicity, lightness of weight and sanitation are particularly necessary.

To these ends my invention consists in the construction and combination of parts as hereinafter described, illustrated in the accompanying drawings and set forth in the claims.

Referring now to the drawings, wherein the same part is designated by the same reference numeral wherever it is shown, Figure I is a plan view of the preferred form of my device, showing the members in assembled relation. Fig. II is a side view of Fig. I. Fig. III shows perspective views of the knife, fork and spoon members out of their assembled relation. Fig. IV is a cross section of the assembled members on the line IV—IV, Fig. I.

Referring more in detail to the parts: 1 designates a knife member, comprising a handle portion 2 and a blade portion 3, struck out of an integral sheet of metal. On each edge, the handle portion 2 is provided with a longitudinally extending, inwardly projecting flange 4, having portions spaced from the handle body which, by their extension over the said handle portion, from channels 5 between the undersurface of the said flanges and flat base of the handle portion.

The fork member 6 is of integral construction, comprising a flat handle portion 7 and a prong portion 8. The handle portion 7 has a central longitudinal groove and rib 9—10 extending throughout its length, which is preferably formed by stamping the sheet metal when the fork is formed.

The spoon member is provided with a flat handle portion 11 and a concaved bowl portion 12, the handle being provided with a groove 13 and a rib 14 on its opposite sides extending the length thereof at its central part. The edges 15 and 16 of said fork and spoon handle portions extend in parallel relation, and when assembled the handle portions 7 and 11 are arranged so that they lie in snug relation on the opposite sides of the handle portion 2 of the knife member, the parallel edges 15 and 16 taking into the channels 5 of said knife member and being held in position thereon by the flanges 4.

The prong portion 8 of the fork member 6, and the bowl portion 12 of the spoon member are concaved to a greater degree than is ordinarily necessary in the construction of individual devices so that they will be slightly sprung to provide a tensioning means whereby the said fork and spoon members will be held in snug relation when assembled on the knife handle.

The tines 17 of the prong portion of said fork member engage the blade portion 3 of the knife member, and the tip 18 of the bowl portion of the spoon member engages the opposite side of the blade portion 3, so that said tines and tip are under tension in their assembled position and lie against said blade to hold the handle portions within the channels 5 of the knife member and against lateral movement from said knife handle portion.

Having thus described my invention, what I claim as new therein and desire to secure by Letters-Patent is:

1. Combination tableware comprising a knife, a fork and a spoon, the knife comprising a handle portion, having edge flanges extending over and spaced from both face portions of the handle, the fork and upon members lying on opposite sides of the knife and comprising handle portions having longitudinal edges projected beneath the flanges on the knife handle.

2. Combination tableware comprising a knife, a fork and a spoon, the knife comprising a handle portion, having edge flanges extending over and spaced from both face portions of the handle, the fork and spoon members lying on opposite sides of the knife, and comprising handle portions having longitudinal edges projected beneath the flanges on the knife handle, and having stiffening ribs extending longitudinally through their central portions and lying between facing edges of the knife handle flanges.

3. Combination tableware consisting of separate knife, fork and spoon members, having flat handle portions, the knife handle having flanges projecting laterally from both edges and turned back over opposite faces of the handle, the fork and spoon handles having edge portions projected beneath said flanges whereby the said members are clamped on opposite sides of the knife.

4. Combination tableware consisting of separate knife, fork and spoon members, having flat handle portions, the knife handle having flanges projecting laterally from both edges and turned back over opposite faces of the handle, the fork and spoon handles having edge portions projected beneath said flanges, and having central ribs extending longitudinally therethrough and tending to spring the side edges against the knife flanges.

In testimony whereof I affix my signature in presence of two witnesses.

JOEL E. HAWLEY.

Witnesses:
  JOHN F. WADE,
  ARTHUR C. BROWN.